United States Patent [19]
Sawai

[11] Patent Number: 5,917,673
[45] Date of Patent: Jun. 29, 1999

[54] MAGNETIC TAPE APPARATUS HAVING A TENSION LEVER WHICH PIVOTS DUE TO CONTACT FROM A BRAKE LEVER

[75] Inventor: Kunio Sawai, Daito, Japan

[73] Assignee: Funai Electric Co., Ltd., Osaka, Japan

[21] Appl. No.: 08/877,308

[22] Filed: Jun. 17, 1997

[30] Foreign Application Priority Data

Jun. 18, 1996 [JP] Japan .............................. 8-005673 U

[51] Int. Cl.⁶ .......................... G11B 5/027; G11B 15/43
[52] U.S. Cl. ............................................. 360/85; 242/334
[58] Field of Search ............................... 360/85, 84, 96.3, 360/95, 96.4, 74.3; 242/334, 334.6, 356, 356.5, 356.7

[56] References Cited

U.S. PATENT DOCUMENTS

| | | | |
|---|---|---|---|
| 3,911,492 | 10/1975 | Ura ............................................. | 360/85 |
| 5,070,422 | 12/1991 | Sasaki et al. .............................. | 360/85 |
| 5,086,359 | 2/1992 | Tsuchiya .................................... | 360/85 |
| 5,333,807 | 8/1994 | Maehara et al. ...................... | 242/334.6 |
| 5,605,300 | 2/1997 | Uetake et al. ........................... | 242/336 |
| 5,697,568 | 12/1997 | Ishii ....................................... | 242/334.6 |
| 5,699,972 | 12/1997 | Nawa ...................................... | 242/334 |

*Primary Examiner*—Brian E. Miller
*Attorney, Agent, or Firm*—Evenson, McKeown, Edwards & Lenahan, P.L.L.C.

[57] ABSTRACT

A magnetic tape apparatus including, on a chassis, a pair of feed and take-up reel pads for engagement with a tape cassette, a tension lever adapted to be raised at the time of loading of the tape cassette to apply tension to a magnetic tape drawn out of the tape cassette, a brake lever for suddenly braking the feed reel pad at the time of stopping of the magnetic tape in a fast-feed state, a rewinding state, or the like, to prevent the magnetic tape from becoming loose, and a mode switching lever for operating the tension lever and the brake lever. The mode switching lever is operated at the time of unloading of the tape cassette to turn the brake lever to thereby make the brake lever engage with the tension lever so as to forcedly turn the tension lever.

3 Claims, 6 Drawing Sheets

MAGNETIC TAPE APPARATUS HAVING A TENSION LEVER WHICH PIVOTS DUE TO CONTACT FROM A BRAKE LEVER

BACKGROUND OF THE INVENTION

1. Field of the Invention

The present invention relates to a magnetic tape apparatus for recording information on a magnetic tape, reproducing or erasing information from a magnetic tape.

2. Description of the Related Art

An example of such a magnetic tape apparatus will be described with reference to FIG. 5. In FIG. 5, the reference numeral 1 designates a tape cassette; 2, a feed reel pad which engages with a feed reel of the tape cassette 1; 3, a take-up reel pad which engages with a take-up reel of the tape cassette 1; 4, a movable tape guide post for drawing a magnetic tape T from the tape cassette 1 and winding the magnetic tape T on a head cylinder 5; 6, a full-width erasing head; 7, an audio erasing head; 8, an audio control head; 9, a stationary tape guide post; 10, a capstan; 11, a pinch roller coming into pressure contact with the capstan 10 through the magnetic tape T or going far from the capstan 10; and 12, a tension lever pivotally supported on a chassis 13 in the neighborhood of its base end portion so as to be reversibly rotatable on a pivot 14 in the direction of an arrow a or an arrow b and provided with a tension post 15 erected in its top end portion. The reference numeral 16 designates a brake lever pivotally supported on the chassis 13 in its center portion so as to be reversibly rotatable on a pivot 17 in the direction of an arrow c or an arrow d. A brake shoe 16a is provided in top end portion of the brake lever 16. A brake spring 18 for urging the brake shoe 16a toward a circular portion 2a of the feed reel pad 2 is engaged with a base end portion of the brake lever 16.

The reference numeral 19 designates a mode switching lever. A long hole 19a formed along the longitudinal direction of the mode switching lever 19 is fitted to a projection portion 13a formed on the chassis 13 so that the mode switching lever 19 can make a reciprocating motion in the direction of an arrow e or an arrow f. A tension cam 20 of the mode switching lever 19 is interlockingly linked to the base end portion 12a of the tension lever 12 through a tension mechanism 21. A brake cam 22 of the mode switching lever 19 is interlockingly linked to the top end portion side of the brake lever 16 through an auxiliary brake plate 23.

The tension mechanism 21 is constituted by: a rocking lever 24 which is pivotally supported on the chassis 13 so as to be swingable on a pivot 24a and which has an engagement pin 24b formed at its one end portion so as to project therefrom to engage with the tension cam 20; a pressure spring 25 for urging the rocking lever 24 to press the engagement pin 24b against the cam 20; a connection spring 26 provided between the base end portion 12a of the tension lever 12 and the other end portion of the rocking lever 24; a lifting rod 28 inserted into the connection spring 26 so that one end portion of the lifting rod 28 is locked to the connection spring 26 by a locking ring 27; and a guide frame 29 for guiding the connection spring 26 and the lifting rod 28.

The auxiliary brake plate 23 is pivotally supported at its center portion on the chassis 13 so as to be swingable on a pivot 30. An engagement pin 31 provided on one end portion of the auxiliary brake plate 23 is engaged with the brake cam 22 whereas a connection pin 32 formed on the other end portion of the auxiliary brake plate 23 is engaged with a recess formed on the top end portion side of the brake lever 16.

The reference numeral 33 designates a band brake which is wound by a half round on the circular portion 2a of the feed reel pad 2. The opposite end portions of the band brake 33 are locked to the chassis 13 and the tension lever 12 respectively. The reference numeral 34 designates a unloading brake member pivotally supported on the chassis 13 so as to be swingable on a pivot 34a. An engagement pin 35 provided at a center portion of the brake member 34 so as to project therefrom is engaged with a cam groove 36 of the mode switching lever 19. A spring 37 for urging a top end portion 34b of the brake member 34 toward the circular portion 2a of the feed reel pad 2 through the band brake 33 is engaged with a base end portion of the brake member 34.

In the aforementioned configuration, when the mode switching lever 19 is moved in the direction of the arrow e as represented by the solid line in FIG. 5 at the time of loading, the base end portion 12a of the tension lever 12 is pulled by the connection spring 26 of the tension mechanism 21 so that the tension lever 12 is raised in the direction of the arrow a. Accordingly, not only the tension post 15 is pressed against the magnetic tape T drawn out of the tape cassette 1 to thereby apply back tension to the magnetic tape T but also the band brake 33 is tensed to come in contact with the circular portion 2a to thereby brake the feed reel pad 2 so that the magnetic tape T is prevented from becoming loose.

When, for example, a stop button is pushed in a fast-feed or rewinding state, the mode switching lever 19 is moved by one pitch in the direction of the arrow f into a half-loading state as represented by the virtual line in FIG. 5. In the half-loading state, the engagement pin 31 of the auxiliary brake plate 23 enters the recess of the brake cam 22, so that the brake lever 16 is turned in the direction of the arrow c. Accordingly, the brake shoe 16a comes into pressure contact with the circular portion 2a of the feed reel pad 2 to stop the feed reel pad 2 suddenly to thereby prevent the magnetic tape T from becoming loose.

When the mode switching lever 19 is moved by two pitches in the direction of the arrow f as shown in FIG. 6 at the time of unloading, the base end portion 12a of the tension lever 12 is pressed up by the lifting rod 28 of the tension mechanism 21. As a result, the tension lever 12 is pushed down in the direction of the arrow b, so that the magnetic tape T goes back into the tape cassette 1. At the same time, the top end portion 34b of the brake member 34 comes into pressure contact with the circular portion 2a of the feed reel pad 2 through the brake band 33 in a state in which the brake shoe 16a is separated from the circular portion 2a of the feed reel pad 2. As a result, the magnetic tape T is prevented from becoming loose.

In the aforementioned conventional configuration, the tension mechanism 21 is constituted by the rocking lever 24, the pressure spring 25, the connection spring 26, the locking ring 27, the lifting rod 28, the guide frame 29, etc. Accordingly, the configuration is complex so that the number of parts is large. Accordingly, the manufacturing cost increases.

SUMMARY OF THE INVENTION

Upon such circumstances as to the disadvantages in the conventional apparatus, an object of the present invention is to provide a magnetic tape apparatus which is simple in configuration and small in the number of parts, and, accordingly, the manufacturing cost can be reduced.

In order to attain the above object, the invention provides a magnetic tape apparatus comprising: a pair of feed and take-up reel pads for engagement with a tape cassette; a tension lever which is raised at the time of loading of the tape cassette to apply tension to a magnetic tape drawn out of the tape cassette; a brake lever for suddenly braking the feed reel pad at the time of stopping of the magnetic tape in a fast-feed state or a rewinding state to prevent the magnetic tape from becoming loose; and a mode switching lever for operating the tension lever and the brake lever, the mode switching lever being operated at the time of unloading of the tape cassette to turn the brake lever to thereby make the brake lever engage with the tension lever so as to forcedly turn the tension lever.

DETAILED DESCRIPTION OF THE PREFERRED EMBODIMENT

Figure 1:
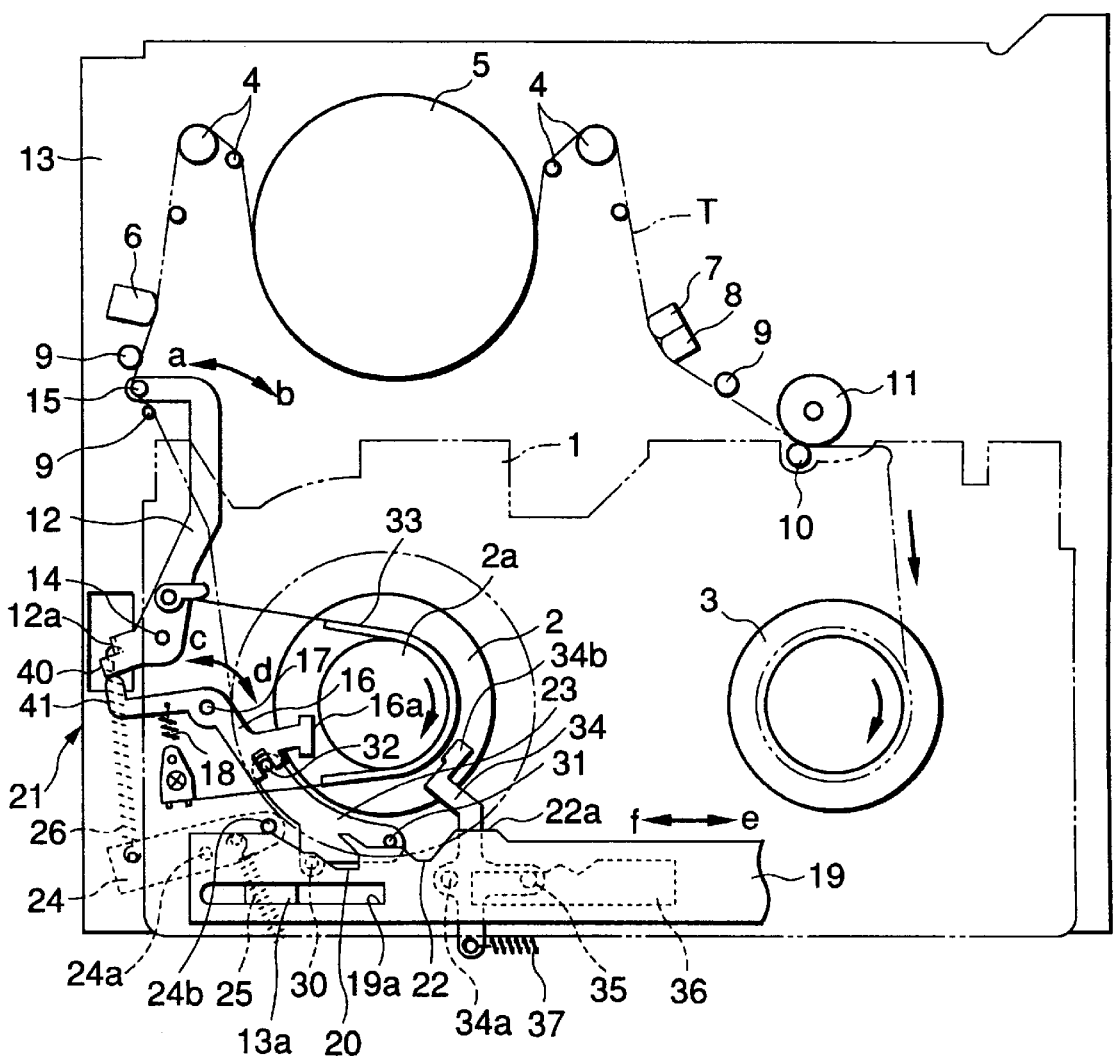
FIG. 1 is a schematic plan view of a magnetic tape apparatus at the time of loading according to an embodiment of the present invention.
Figure 2:
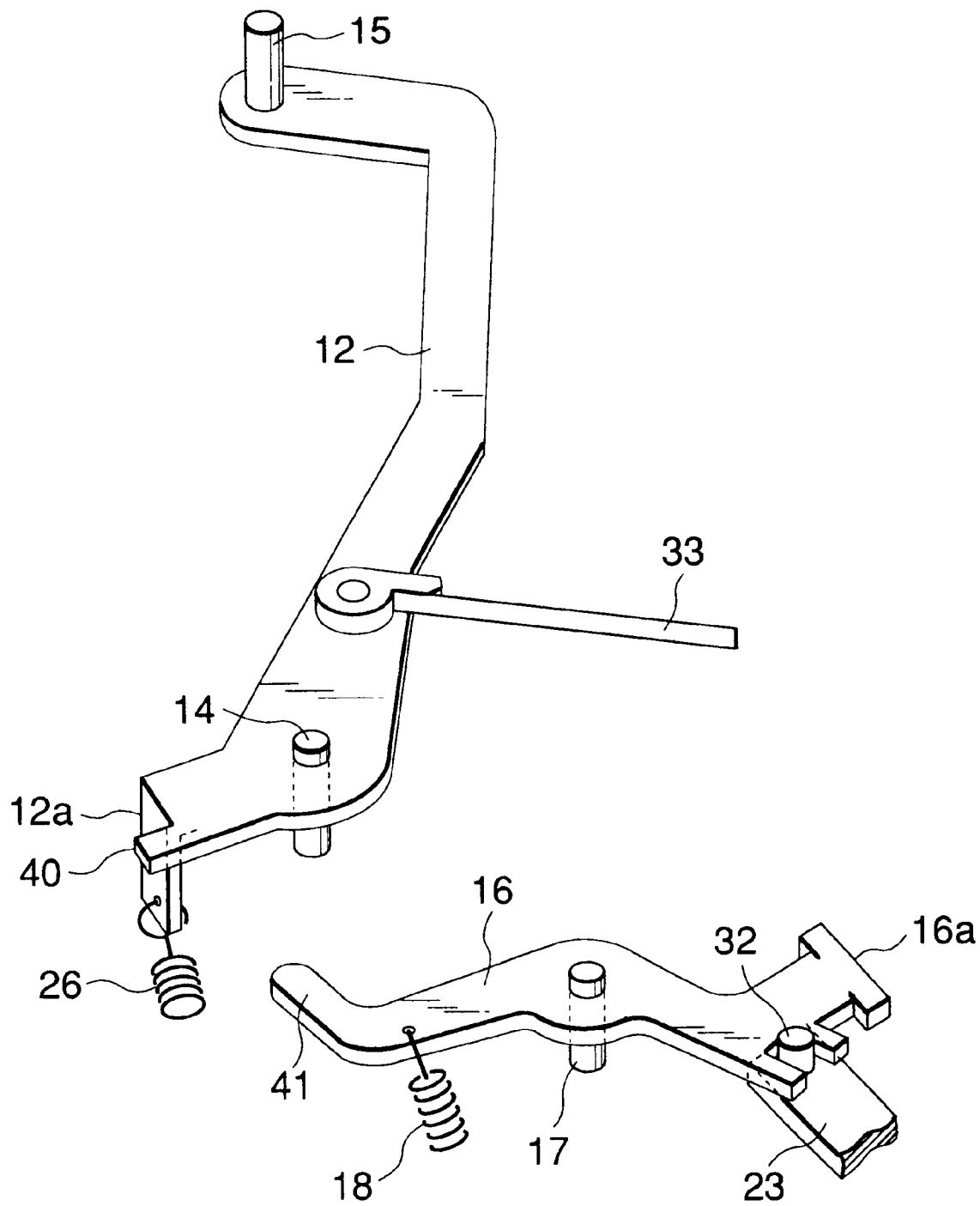
FIG. 2 is an exploded perspective view of a main part of the magnetic tape apparatus.
Figure 5:
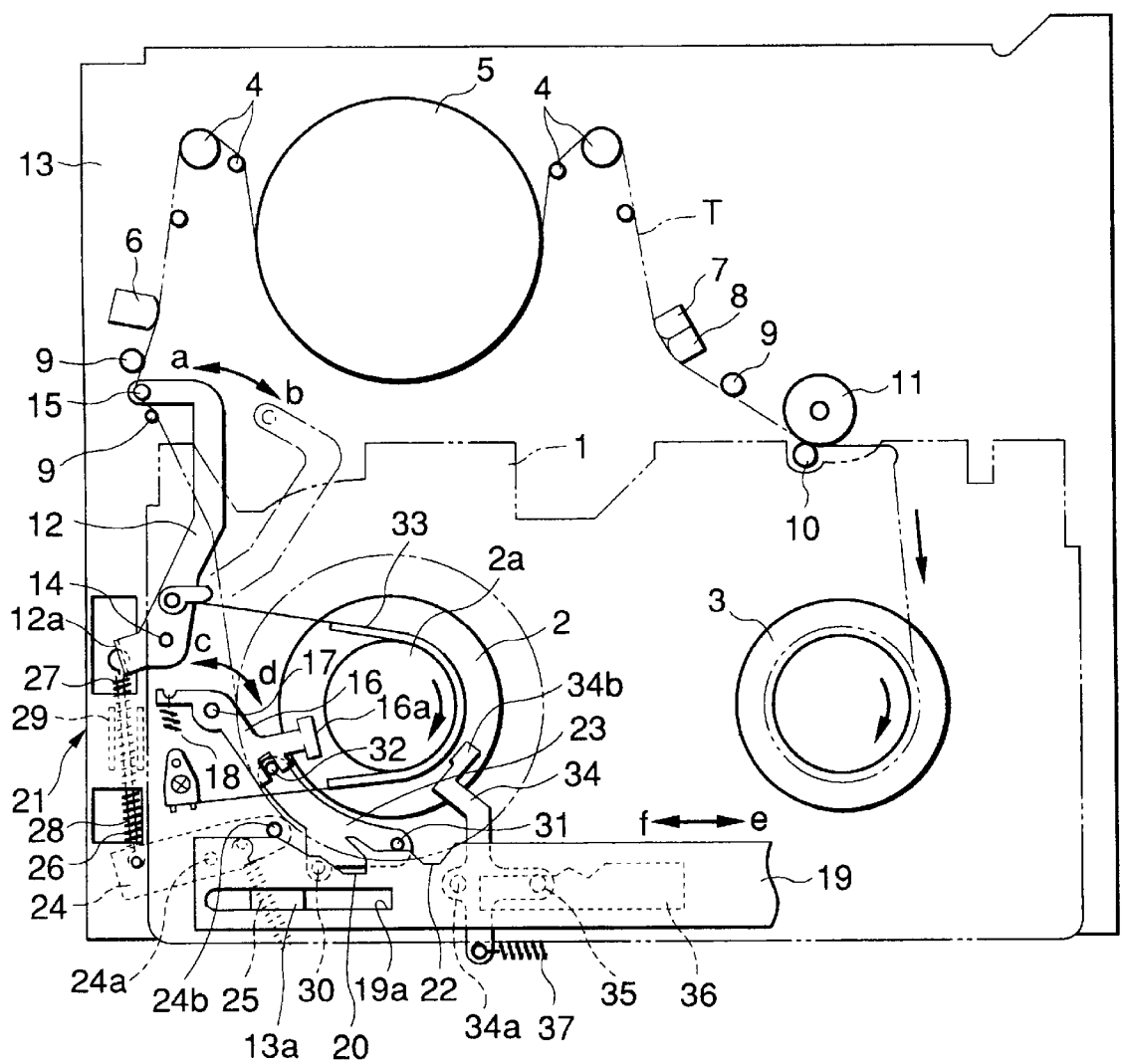
FIG. 5 is a schematic plan view of a conventional magnetic tape apparatus at the time of loading.
Figure 6:
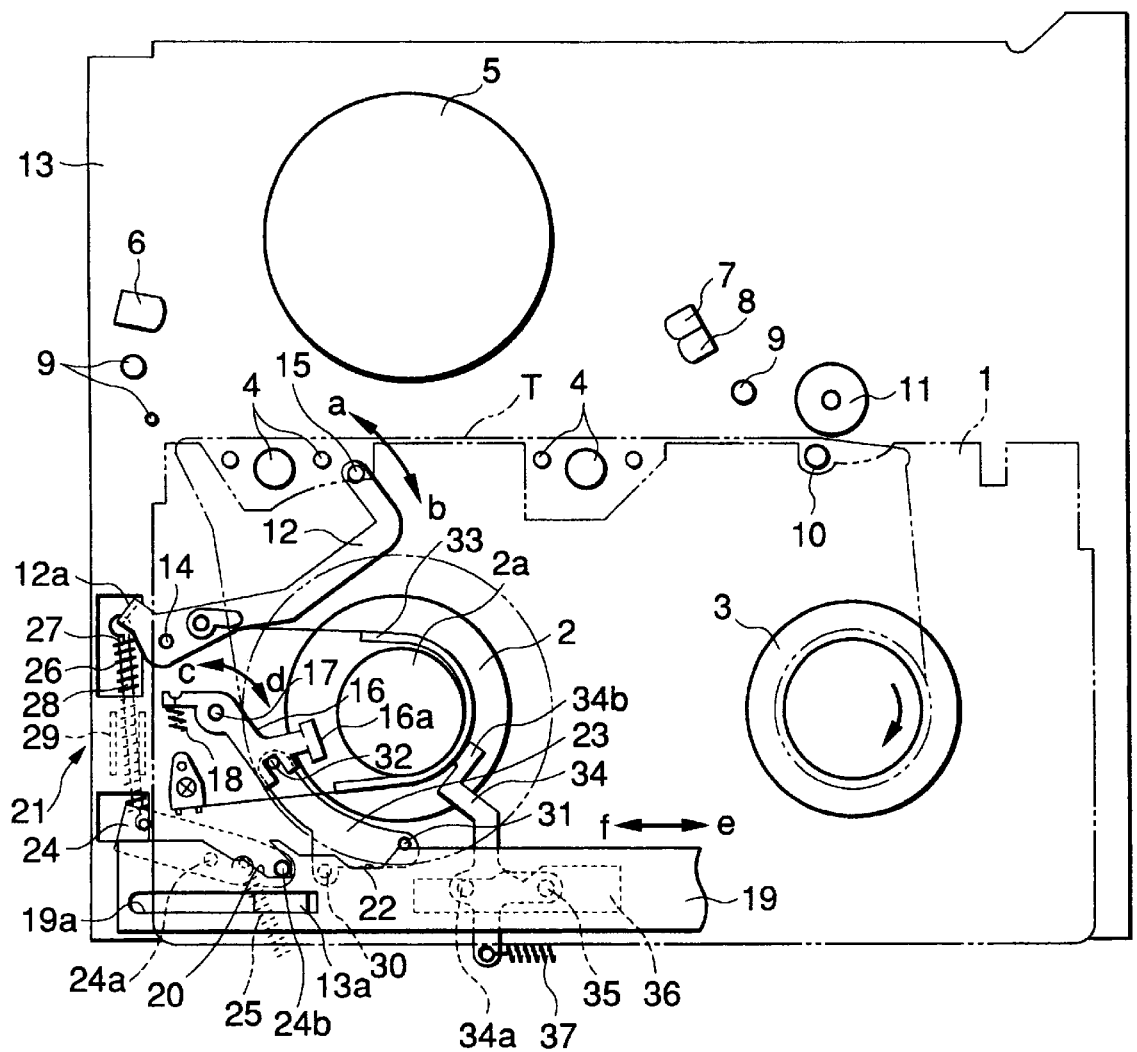
FIG. 6 is a schematic plan view of the conventional magnetic tape apparatus at the time of unloading.

An embodiment of the present invention will be described below with reference to the drawings. FIGS. 1 and 2 show a magnetic tape apparatus according to an embodiment of the present invention. A projection (to-be-engaged portion) 40 extending toward a brake lever 16 is formed on the side of a base end portion 12a of a tension lever 12 integrally with the tension lever 12. A substantially L-shaped projection (engaging portion) 41 is formed at a base end portion of the brake lever 16 integrally with the brake lever 16 so as to be opposite to the projection 40. Further, a convex portion (operation portion) 22a is formed on a brake cam 22 of a mode switching lever 19 in order to make the projections 40 and 41 engage with each other. The configuration other than the above description is substantially equal to that of the conventional apparatus shown in FIGS. 5 and 6. Accordingly, the same parts as those in FIGS. 5 and 6 are referenced correspondingly and the description of those parts will be omitted.

In the aforementioned configuration, when the mode switching lever 19 is moved in the direction of the arrow e as shown in FIG. 1 at the time of loading in the same manner as in the conventional apparatus, not only the tension lever 12 is raised in the direction of the arrow a to apply back tension to the magnetic tape T but also the band brake 33 brakes the feed reel pad 2. Further, the brake lever 16 is turned in the direction of the arrow c, so that the brake shoe 16a is separated from the circular portion 2a of the feed reel pad 2.

In this state, the two projections 40 and 41 are not engaged with each other but are close to each other.

Figure 3:
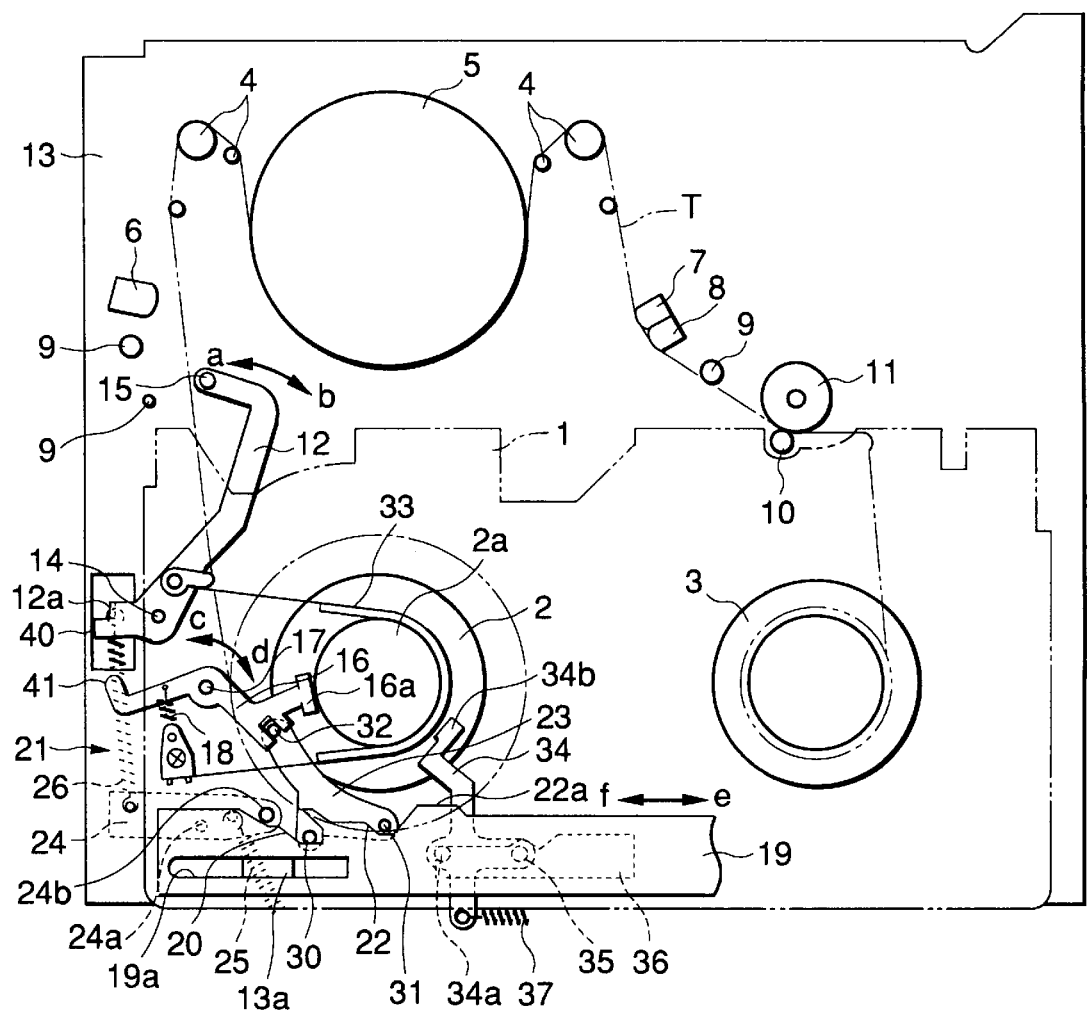
FIG. 3 is a schematic plan view of the magnetic tape apparatus in a state in which sudden braking is applied.

When, for example, the stop button is pushed in a fast-feed or rewinding state, the mode switching lever 19 is moved by one pitch in the direction of the arrow f to bring the mode into a half-loading state as shown in FIG. 3 in the same manner as in the conventional apparatus. In the half-loading state, the engagement pin 31 of the auxiliary brake plate 23 enters the recess of the brake cam 22, so that the brake lever 16 is turned in the direction of the arrow c. Accordingly, the brake shoe 16a comes into pressure contact with the circular portion 2a of the feed reel pad 2 to stop the feed reel pad 2 suddenly to thereby prevent the magnetic tape T from becoming loose.

In this state, the two projections 40 and 41 are not engaged with each other and are slightly separated from each other.

Figure 4:
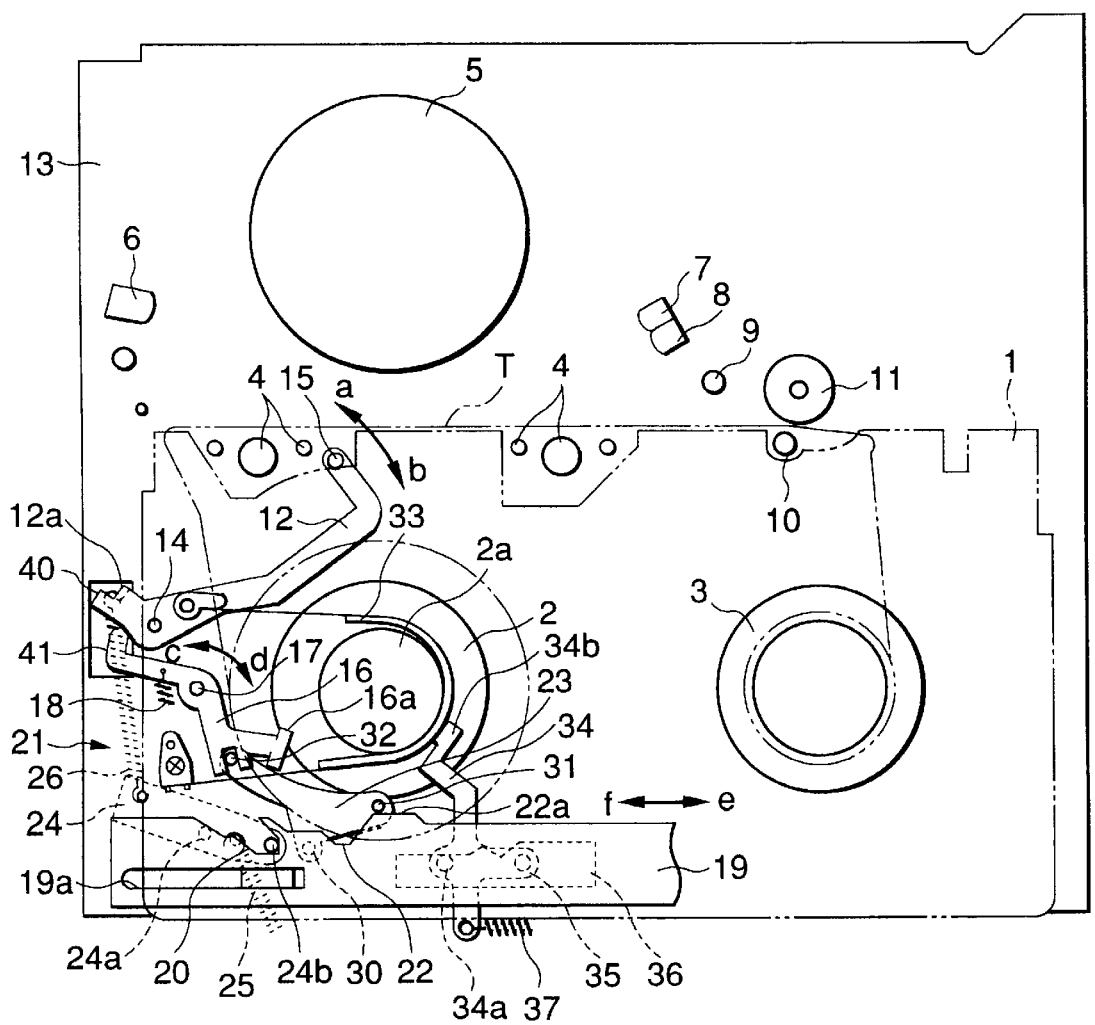
FIG. 4 is a schematic plan view of the magnetic tape apparatus at the time of unloading.

When the mode switching lever 19 is moved by two pitches in the direction of the arrow f as shown in FIG. 4 at the time of unloading, not only the connection spring 26 of the tension mechanism 21 is loosened but also the engagement pin 31 is engaged with the convex portion 22a of the brake cam 22. Accordingly, the brake lever 16 is turned in the direction of the arrow d through the auxiliary brake plate 23, so that the projection 41 on the side of the brake lever 16 comes into contact with the projection 40 on the side of the tension lever 12 to thereby push up the projection 40. As a result, the tension lever 12 is forcedly pushed down in the direction of the arrow b. On the other hand, the top end portion 34b of the brake member 34 comes into pressure contact with the circular portion 2a of the feed reel pad 2 through the brake band 33 so that the magnetic tape T is prevented from becoming loose.

In this case, the parts such as the locking ring 27 and the lifting rod 28 of the conventional tension mechanism 21 for turning the tension lever 12 (see FIG. 5) become unnecessary so that the number of parts can be made small and the manufacturing cost can be made low.

According to the present invention, the tension lever can be turned using the brake lever at the time of unloading. Accordingly, the parts (such as the locking ring, the lifting rod, etc.) of the conventional tension mechanism for turning the tension lever are not required. Accordingly, the number of parts can be made small and the manufacturing cost can be made low.

What is claimed is:

1. A magnetic tape apparatus comprising:
    a pair of feed and take-up reel pads for engagement with a tape cassette;
    a tension lever which is raised into a raised position at the time of loading of the tape cassette to apply tension to a magnetic tape drawn out of the tape cassette and lowered into a lowered position at the time of unloading to release tension on the magnetic tape;
    a brake lever for suddenly braking said feed reel pad at the time of stopping of the magnetic tape in a fast-feed state or a rewinding state to prevent the magnetic tape from becoming loose, wherein the brake and tension levers are pivotally arranged such that portions thereof are capable of contacting one another;
    a mode switching lever for operating said tension lever and said brake lever, said mode switching lever being operated at the time of unloading of the tape cassette to turn said brake lever to thereby make said brake lever contact said tension lever so as to forcedly turn said tension lever into the lowered position.

2. The magnetic tape apparatus according to claim 1, wherein an engageable portion is formed at a base end portion of said tension lever, an engaging portion is formed on said brake lever so as to be opposite to said engageable portion, and an operation portion for making said engaging portion contact with said engageable portion is formed on said mode switching lever.

3. The magnetic tape apparatus according to claim 2, wherein said engageable portion is formed integrally with said tension lever so as to extend toward said brake lever, and said engaging portion is formed at a base end portion of said brake lever integrally with said brake lever.

* * * * *